(12) United States Patent
Wu

(10) Patent No.: US 10,869,349 B2
(45) Date of Patent: Dec. 15, 2020

(54) DEVICE AND METHOD OF HANDLING CARRIER AGGREGATION AND DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 143 days.

(21) Appl. No.: 16/048,353

(22) Filed: Jul. 30, 2018

(65) Prior Publication Data

US 2019/0045566 A1 Feb. 7, 2019

Related U.S. Application Data

(60) Provisional application No. 62/540,037, filed on Aug. 1, 2017.

(51) Int. Cl.
*H04W 76/15* (2018.01)
*H04W 76/27* (2018.01)
(Continued)

(52) U.S. Cl.
CPC ............. *H04W 76/15* (2018.02); *H04L 5/001* (2013.01); *H04L 5/0035* (2013.01);
(Continued)

(58) Field of Classification Search
CPC ............. H04W 52/50; H04W 72/1268; H04W 72/046; H04W 16/28
See application file for complete search history.

(56) References Cited

U.S. PATENT DOCUMENTS

2014/0092865 A1 4/2014 Heo
2015/0264694 A1* 9/2015 Nagata ................. H04W 28/16
370/329
(Continued)

FOREIGN PATENT DOCUMENTS

CN 104349466 A 2/2015
CN 104704873 A 6/2015
(Continued)

OTHER PUBLICATIONS

Catt, "Further details on NR 4-step RA Procedure", 3GPP TSG RAN WG1 Meeting #88bis, R1-1704541, Spokane, USA, Apr. 3-7, 2017.
(Continued)

*Primary Examiner* — Romani Ohri
(74) *Attorney, Agent, or Firm* — Winston Hsu

(57) ABSTRACT

A network comprising a first base station (BS) and a second BS is configured to execute instructions of the first BS connecting to a communication device via a primary cell (PCell) of the first BS with a first SRB; the second BS as a secondary node (SN) connecting to the communication device via a primary secondary cell (PSCell) with a second signalling radio bearer (SRB) while the first BS as a master node (MN) connects to the communication device; and the second BS transmitting a radio resource control (RRC) message to the communication device, wherein the RRC message configures a secondary cell (SCell) to the communication device for a carrier aggregation (CA) and comprises a random access (RA) channel (RACH) configuration, the RACH configuration configures at least one RACH resource and the RRC message configures an association configuration.

10 Claims, 6 Drawing Sheets

(51) Int. Cl.
  *H04W 72/04* (2009.01)
  *H04W 56/00* (2009.01)
  *H04W 74/08* (2009.01)
  *H04L 5/00* (2006.01)

(52) U.S. Cl.
  CPC ....... *H04W 56/001* (2013.01); *H04W 72/042* (2013.01); *H04W 74/0833* (2013.01); *H04W 76/27* (2018.02); *H04L 5/0051* (2013.01); *H04L 5/0053* (2013.01); *H04L 5/0057* (2013.01); *H04L 5/0091* (2013.01)

(56) References Cited

U.S. PATENT DOCUMENTS

2015/0327243 A1* 11/2015 Yin .................. H04L 5/001 370/329
2018/0054846 A1* 2/2018 Nagasaka ......... H04W 74/0833
2020/0145961 A1* 5/2020 Harada ............. H04L 5/0053

FOREIGN PATENT DOCUMENTS

CN    106341899 A    1/2017
EP    3 122 142 A1    1/2017

OTHER PUBLICATIONS

Office action dated Jul. 8, 2019 for the Taiwan application No. 107126601, filing date Aug. 1, 2018, p. 1-11.
Search Report dated Dec. 10, 2018 for EP application No. 18186718.5, pp. 1-5.
Ericsson, "Multiple Preamble Transmissions in NR Random Access", 3GPP TSG-RAN WG2 #98-AH, Tdoc R2-1707131, Jun. 27-29, 2017, Qingdao, P.R. of China, XP051301624, pp. 1-7.
Office action dated Mar. 2, 2020 for the China application No. 201810865874.1, filing date Aug. 1, 2018, p. 1-11.
Office action dated Jul. 21, 2020 for the China application No. 201810865874.1, filing date Aug. 1, 2018, p. 1-13.

* cited by examiner

DEVICE AND METHOD OF HANDLING CARRIER AGGREGATION AND DUAL CONNECTIVITY

CROSS REFERENCE TO RELATED APPLICATIONS

This application claims the benefit of U.S. Provisional Application No. 62/540,037 filed on Aug. 1, 2017, which is incorporated herein by reference.

BACKGROUND OF THE INVENTION

1. Field of the Invention

The present invention relates to a device and a method used in a wireless communication system, and more particularly, to a device and a method of handling a carrier aggregation and dual connectivity.

2. Description of the Prior Art

A new radio (NR) system, initiated by the third generation partnership project (3GPP), includes a new radio interface and a new radio network architecture that provides a high data rate, a low latency, packet optimization, and an improved system capacity and an improved coverage.

SUMMARY OF THE INVENTION

The present invention therefore provides a method and related communication device for handling a carrier aggregation and dual connectivity to solve the abovementioned problem.

A network comprising a first base station (BS) and a second BS comprises at least one storage device; and at least one processing circuit coupled to the at least one storage device. The at least one storage device stores, and the at least one processing circuit is configured to execute instructions of: the first BS connecting to a communication device via a primary cell (PCell) of the first BS with a first signalling radio bearer (SRB); the second BS as a secondary node (SN) connecting to the communication device via a primary secondary cell (PSCell) with a second SRB while the first BS as a master node (MN) connects to the communication device via the PCell with the first SRB; the second BS transmitting a radio resource control (RRC) message on the second SRB on the PSCell to the communication device, wherein the RRC message configures a secondary cell (SCell) to the communication device for a carrier aggregation (CA) and comprises a random access (RA) channel (RACH) configuration for the communication device to perform a RA to the SCell, the RACH configuration configures at least one RACH resource and the RRC message configures an association configuration associating the at least one RACH resource to a synchronization signal (SS) block or a channel state information reference signal (CSI-RS) transmitted on the SCell; the second BS receiving a RRC response message for responding to the RRC message from the communication device on the second SRB on the PSCell; the second BS receiving a RA preamble transmitted by the communication device on the SCell according to the at least one RACH resource; and the second BS transmitting a RA response (RAR) to the communication device in response to the first RA preamble.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
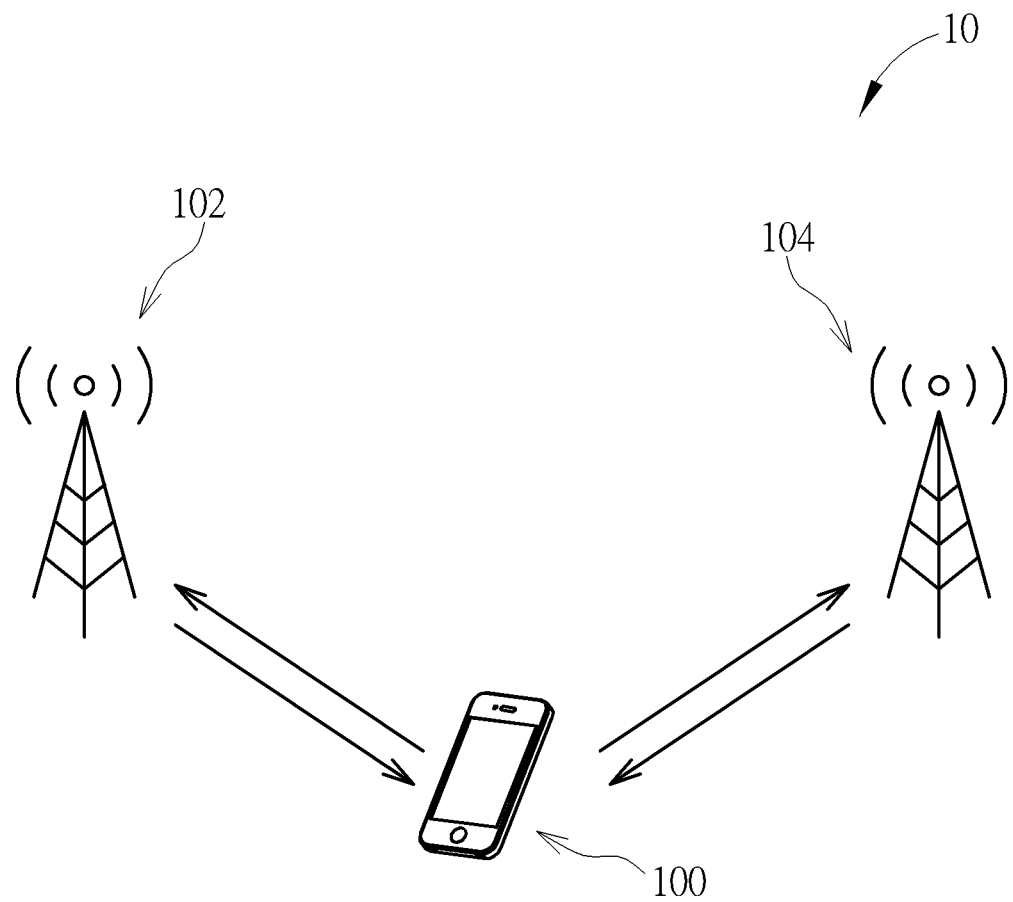
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

As shown in FIG. 1, the communication device 100 may be configured to simultaneously connect to the BSs 102 and 104 (i.e., dual connectivity (DC)). That is, the communication device 100 in the DC may perform a transmission/reception via both the BSs 102 and 104. For example, the communication device 100 may receive packets from the BS 102 at a first carrier frequency and the BS 104 at a second carrier frequency, or the communication device 100 may transmit packets to the BS 102 at a first carrier frequency and the BS 104 at a second carrier frequency. In addition, one of the BSs 102 and 104 may be a master node (MN) and the other BS may be a secondary node (SN). The first carrier frequency and the second carrier frequency may or may not be overlapped.

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
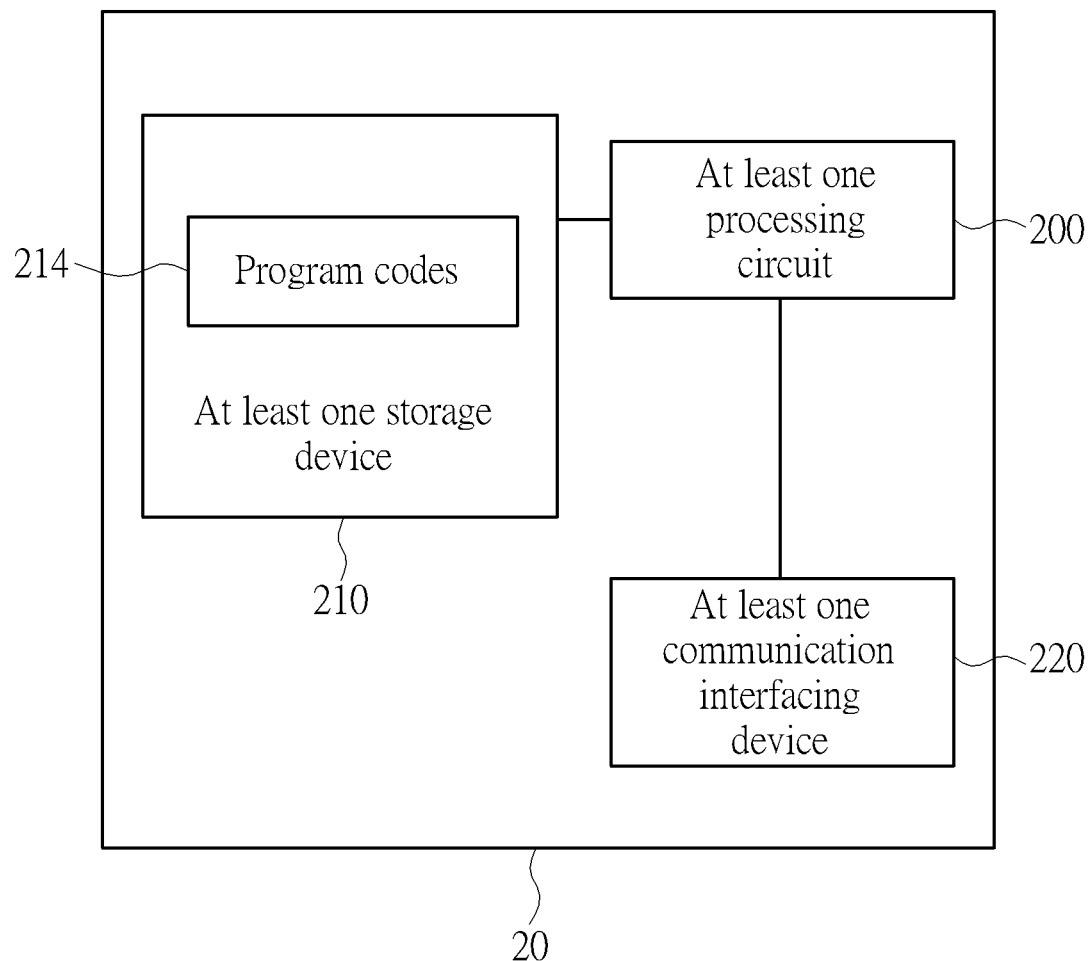
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the examples.

A protocol architecture may be used for illustrating that a use of a radio bearer (RB) depends on how the RB is setup. A radio bearer may be a data RB (DRB) for a user plane data transmission and/or reception, and a signalling RB (SRB) for a control plane data transmission and/or reception. A DRB configuration may include at least one of a DRB identity, a packet data convergence protocol (PDCP) configuration, a radio link control (RLC) configuration, a logical channel identity and a logical channel configuration (e.g., priority and/or logical channel group). A SRB configuration may include a SRB identity, the RLC configuration and the logical channel configuration. In the dual connectivity, there may be three types of RB: a master cell group (MCG) bearer, a secondary cell group (SCG) bearer and a split bearer. The MCG bearer may utilize radio protocols located at the MN, to radio resources (e.g., time and frequency resources) of the MN. The SCG bearer may utilize radio protocols located at the SN, to use radio resources of the SN. The split bearer may utilize protocols located at both the MN and the SN, to use both the radio resources of the MN and the SN. The split bearer may be a MCG split bearer or a SCG split bearer. A DRB may be the MCG bearer, the SCG bearer or the split bearer. A SRB may be configured as the MCG bearer or the split bearer.

A new radio (NR) BS (e.g., gNB) broadcasts a synchronization signal block (SSB) in a pattern or periodically. The SSB includes a primary synchronization signal (PSS), a secondary synchronization signal (SSS) and/or a physical broadcast channel (PBCH). The SSB may have a SSB index (e.g., 6 bits) indicating/identifying the SSB. The SSB index may be carried in the PBCH on which a master information block (MIB) and demodulation reference signal(s) are transmitted by a BS.

Figure 3:
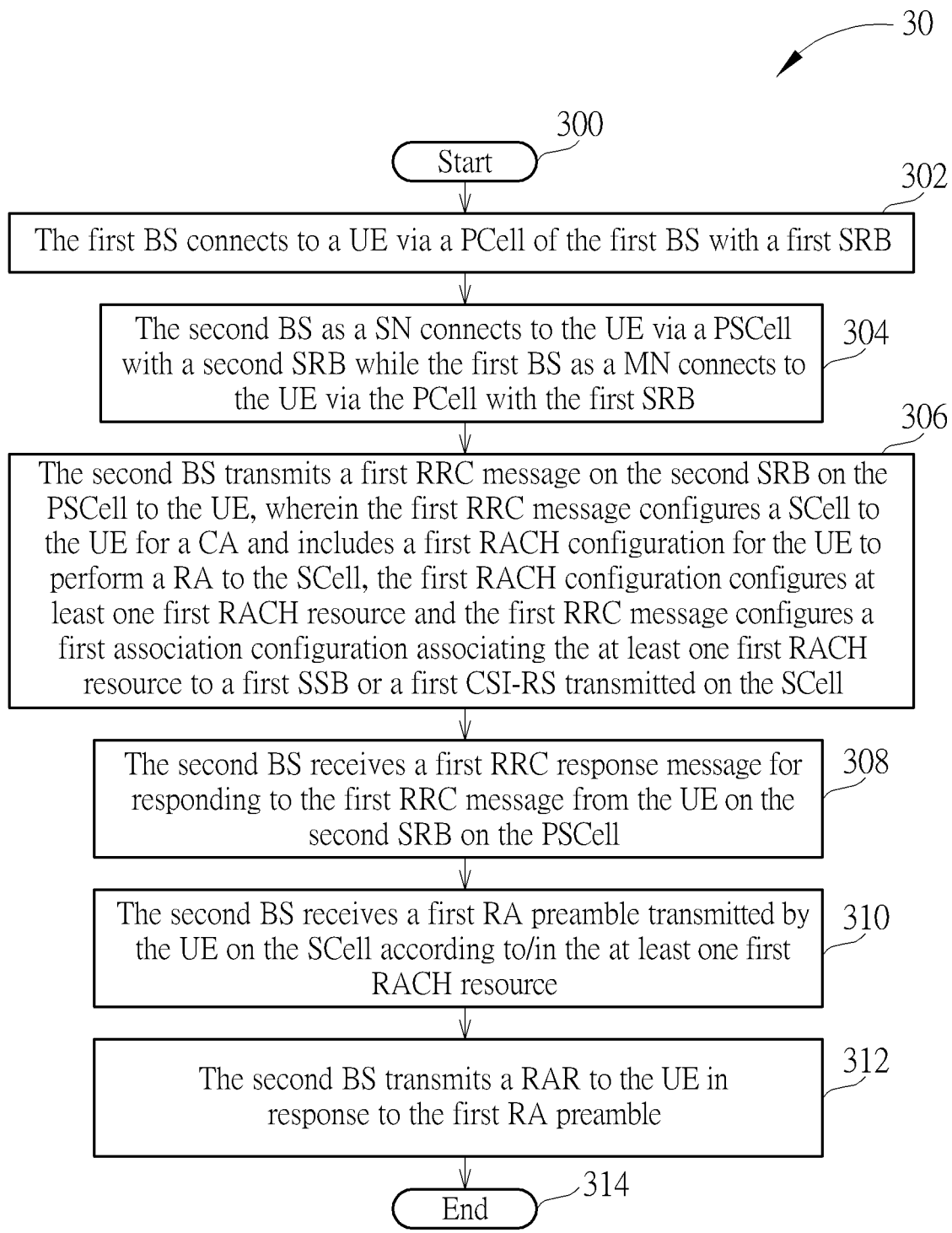
FIG. 3 is a flowchart of a process according to an example of the present invention.

A process 30 in FIG. 3 may be utilized in a network including a first BS and a second BS, and includes the following steps:

Step 300: Start.

Step 302: The first BS connects to a UE via a PCell of the first BS with a first SRB.

Step 304: The second BS as a SN connects to the UE via a primary secondary (PSCell) with a second SRB while the first BS as a MN connects to the UE via the PCell with the first SRB.

Step 306: The second BS transmits a first RRC message on the second SRB on the PSCell to the UE, wherein the first RRC message configures (e.g., add) a SCell to the UE for a carrier aggregation (CA) and includes a first random access (RA) channel (RACH) configuration for the UE to perform a RA to the SCell, the first RACH configuration configures at least one first RACH resource and the first RRC message configures a first association configuration associating the at least one first RACH resource to a first SSB or a first channel state information reference signal (CSI-RS) transmitted on the SCell.

Step 308: The second BS receives a first RRC response message for responding to the first RRC message from the UE on the second SRB on the PSCell.

Step 310: The second BS receives (or detects) a first RA preamble transmitted by the UE on the SCell according to/in the at least one first RACH resource.

Step 312: The second BS transmits a RA response (RAR) to the UE in response to the first RA preamble.

Step 314: End.

According to the process 30, the second BS communicates with the UE via the SCell according to the first RRC message.

In one example, the RAR includes a preamble identifier associated to the first RA preamble. In one example, the first association configuration is included in the first RACH configuration or in the first RRC message.

In one example, the second BS transmits (or broadcasts) the first SSB or the first CSI-RS on the SCell. When the first association configuration associates the at least one first RACH resource to the first CSI-RS instead of the first SSB, the second BS may still transmit the first SSB on the SCell.

In one example, the at least one first RACH resource includes time resource (s) (e.g., which OFDM symbol (s), slot (s) or subframe(s)) and/or frequency resource (s) (e.g., which physical resource block (s) (PRB(s)) or which subcarrier(s)) on the SCell and/or the first RA preamble. In one example, the first RA preamble may be configured in the first RACH configuration, and may be associated to the at least one first RACH resource and/or the first SSB (or the first CSI-RS). In one example, the first RA preamble may a dedicated preamble configured in the first RRC message. In one example, when the first RA preamble is not configured by the at least one first RACH resource, the first RA preamble is selected by the UE from a plurality of RA preambles. In one example, the plurality of RA preambles is configured in the first RACH configuration, is configured in the first RRC message, is predefined in a 3GPP specification or is configured in a system information block (SIB). The SIB may be included in the first RRC message or broadcasted by the second BS on the SCell or the PSCell.

In one example, in response to the first RRC message, the UE transmits the first RA preamble using/in (or on) one or more of the at least one first RACH resource on the SCell when the UE receives (or detects) the first SSB or the first CSI-RS. The second BS may receive the first RA preamble in (or on) the at least one first RACH resource. Thus, according to the first RA preamble received by the second BS, the second BS knows that the UE receives the first SSB or the first CSI-RS on the SCell. In one example, the second BS determines to use (e.g., operate) at least one transmit (Tx) beam associated to the first SSB or the first CSI-RS to transmit a control signal (e.g., physical DL control channel (PDCCH)) and/or data (e.g., physical DL shared channel (PDSCH)) on the SCell to the UE, according to/in response to the first RA preamble.

In one example, the UE connects to the second BS on the SCell according to the first RRC message, while connecting to the first BS on the PCell. Thus, the UE communicates with the second BS on the SCell and the PSCell together with the first BS on the PCell.

In one example, the second BS transmits the RAR on the SCell. When the second BS transmits the RAR on the SCell, the second BS may transmit the RAR on a Tx beam which is associated to (corresponding to) the first SSB or the first CSI-RS on the SCell or which is associated to (corresponding to) a receive (Rx) beam receiving the first RA preamble.

In one example, the second BS transmits the RAR on the PSCell. When the second BS transmits the RAR on the PSCell, the second BS may transmit the RAR on a Tx beam (e.g., narrow beam or wide beam) on the PSCell, wherein the Tx beam is neither associated to the first SSB nor associated to the first CSI-RS. The Tx beam may be associated to a third SSB or a third CSI-RS transmitted on the PSCell.

In one example, the second BS transmits transmissions on a first plurality of Tx beams or on a single Tx beam in the PSCell. The second BS may transmit transmissions on a second plurality of Tx beams in the SCell or a new PSCell. The first plurality of Tx beams may be same as or different from the second plurality of Tx beams. One or more of the first plurality of Tx beams may be same as one or more of the second plurality of Tx beams.

In one example, the first association configuration includes (or indicates) a SSB index of the first SSB. In one example, the first association configuration includes (or indicates) a CSI-RS configuration of the first CSI-RS. The CSI-RS configuration may configure time resource and/or frequency resource of the first CS-RS. The CSI-RS configuration may include a CSI-RS index identifying the first CSI-RS.

In one example, the first RACH configuration includes at least one second RACH resource and a second association configuration associating to the at least one second RACH resource to a second SSB or a second CSI-RS transmitted on the SCell. The at least one second RACH resource may include time resource (s) (e.g., which OFDM symbol (s), slot(s) or subframe(s)) and/or frequency resource(s) (e.g., which PRB(s) or which subcarrier(s) on the SCell and/or a second RA preamble. In one example, the first RRC message includes a second RACH configuration including the at least one second RACH resource and the second association configuration. Then, the UE may determine to use the at least one first RACH resource instead of the at least one second RACH resource, when a signal strength of the first SSB (or the first CSI-RS) measured/received by the UE is better than a signal strength of the second SSB (or the second CSI-RS) measured/received by the UE.

In the above examples, the UE may determine to use the at least one second RACH resource instead of the at least one first RACH resource, when a signal strength of the second SSB (or the second CSI-RS) measured/received by the UE is better than a signal strength of the first SSB (or the first CSI-RS) measured/received by the UE. In response to the determination, the UE may transmit the first RA preamble or a second RA preamble in one or more of the at least one second RACH resource. In one example, the second RA preamble may be configured in the second RACH configuration, and may be associated to the at least one second RACH resource and/or the second SSB (or the second CSI-RS). In one example, the second RA preamble is a dedicated preamble configured in the first RRC message. In one example, the second RA preamble may be selected from a plurality of RA preambles. The plurality of RA preambles may be configured in the first RACH configuration, may be configured in the first RRC message, may be predefined in a 3GPP specification or may be configured in the SIB.

In one example, the second association configuration may configure (or include) a SSB index of the second SSB. In one example, the second association configuration includes a CSI-RS configuration of the second CSI-RS. The CSI-RS configuration may configure time resource and/or frequency resource of the second CS-RS. The CSI-RS configuration may include a CSI-RSI index identifying the second CSI-RS.

In one example, the first RRC message does not configure a handover. That is, the first RRC message configures the SCell without involving the handover.

In one example, the first BS is a MN (e.g., master evolved Node-B (MeNB)) and the second BS is a SN (e.g., Secondary gNB). The first RRC message may be an NR RRC message (e.g., NR RRC Reconfiguration message). The first RRC response message may be a NR RRC response message (e.g., NR RRC Reconfiguration Complete message).

In one example, the UE connects to the first BS (or the first BS connects to the UE) by performing a RRC connection establishment procedure. In the RRC connection establishment procedure, the UE transmits a RRC Connection Request message to the first BS and receives a RRC Connection Setup message from the first BS. When the UE receives the RRC Connection Setup message, the UE connects to the first BS. When the first BS transmits the RRC Connection Setup message, receives an acknowledgement message acknowledging the RRC connection Setup message or receives a RRC Connection Complete message responding to the RRC Connection Setup message from the UE, the first BS connects to the UE.

In one example, the UE connects to the first BS (or the first BS connects to the UE) by performing a handover procedure initiated by a third BS. The third BS may transmit a handover command to the UE to initiate the handover procedure. When the first BS receives a handover complete message from the UE, the first BS connects to the UE. When the UE transmits the handover complete message to the first BS, the UE connects to the first BS.

In one example, the RACH configuration includes at least one information element (IE) which includes a RACH resource (e.g., the at least one (first and/or second) RACH resource) and/or the above association configuration.

In one example, a RACH resource (e.g., the at least one (first and/or second) RACH resource) includes time unit(s), subcarrier(s) and/or PRB(s). A time unit may be formed by a plurality of orthogonal frequency division multiplexing (OFDM) symbols, slot(s), mini-slot(s) or subframe(s)). A PRB may include a plurality of subcarriers (e.g., 12 or 24 subcarriers). the at least one first RACH resource and the at least one second RACH resource may be different. The first SSB, the second SSB and the third SSB may be the same or different. The first CSI-RS, the second CSI-RS and the third CSI-RS may be the same or different.

In one example, the second BS receives a first UE capability of the UE from the first BS in a SN Addition Request message. The first UE capability may be related to a beamforming capability (e.g.; beam correspondence supported or not) or a RA capability. The second BS may determine a RACH resource (e.g., the at least one (first and/or second) RACH resource) (e.g., content of the RACH resource) according to the first UE capability. In one example, the SN Addition Request message may include a second UE capability of the UE. The second UE capability may be related to a CSI-RS receiving capability (e.g., a CSI-RS is supported or not). The second BS may determine a RACH resource associated to the CSI-RS, when the second UE capability that indicates the CSI-RS is supported. The second BS may determine the RACH resource associated to the SSB, when the second UE capability indicates that the CSI-RS is not supported.

In one example, the second BS may transmit a PDCCH order (e.g., a DL control information (DCI)) on the SCell to the UE, when/after transmitting the first RRC message or receiving the first RRC response message. The PDCCH order may indicate to the UE to transmit the first (or second) RA preamble. In one example, the PDCCH order may include the preamble identifier associated to (or of or corresponding to) the first (or second) RA preamble. The second BS may transmit the PDCCH order together with the first SSB or the first CSI-RS on a Tx beam associated to the SSB or the CSI-RS. The second BS may transmit the PDCCH order together with the first SSB or the first CSI-RS in the time unit.

Figure 4:
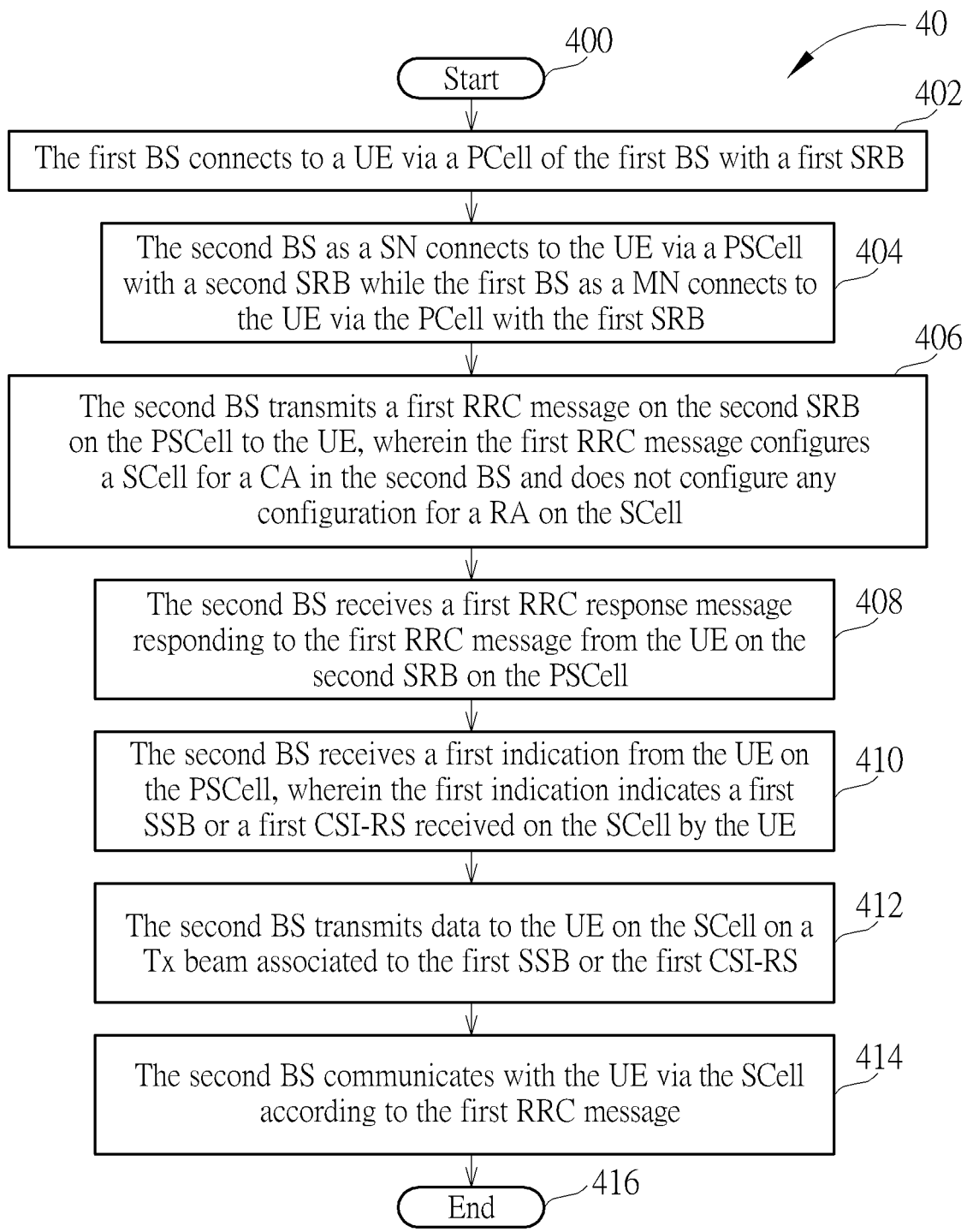
FIG. 4 is a flowchart of a process according to an example of the present invention.

A process 40 in FIG. 4 may be utilized in a network including a first BS and a second BS, and includes the following steps:

Step 400: Start.

Step 402: The first BS connects to a UE via a PCell of the first BS with a first SRB.

Step 404: The second BS as a SN connects to the UE via a PSCell with a second SRB while the first BS as a MN connects to the UE via the PCell with the first SRB.

Step 406: The second BS transmits a first RRC message on the second SRB on the PSCell to the UE, wherein the first RRC message configures a SCell for a CA in the second BS and does not configure any configuration for a RA on the SCell.

Step 408: The second BS receives a first RRC response message responding to the first RRC message from the UE on the second SRB on the PSCell.

Step 410: The second BS receives a first indication from the UE on the PSCell, wherein the first indication indicates a first SSB or a first CSI-RS received on the SCell by the UE.

Step 412: The second BS transmits data to the UE on the SCell on a Tx beam associated to the first SSB or the first CSI-RS.

Step 414: The second BS communicates with the UE via the SCell according to the first RRC message.

Step 416: End.

According to the process 40, the second BS knows that the UE receives the first SSB or the first CSI-RS on the SCell, and transmits the data to the UE on the SCell on the Tx beam associated to the first SSB or the first CSI-RS. In one example, the first indication includes information associated to the first SSB or the first CSI-RS. The information may include a measurement result or a channel quality indicator (CQI) value.

In one example, the second BS receives a second indication from the UE on the PSCell, wherein the second indication indicates a second SSB or a second CSI-RS received on the SCell by the UE. In one example, the second indication includes information associated to the second SSB or the second CSI-RS. The information may include a measurement result or a CQI value.

In one example, the first (or second) indication is transmitted in a physical UL control channel (PUCCH) in a PUCCH message. In one example, the first (or second) indication is transmitted in a reference signal (RS) (e.g., sounding RS (SRS), demodulation signal or specific RS). In one example, the first (or second) indication is transmitted in a physical UL shared channel (PUSCH). The PUSCH may include a Medium Access Control (MAC) PDU, a MAC Control Element (CE), a RLC PDU (e.g., header of the RLC PDU), a PDCP PDU (e.g., header of the PDCP PDU) or a RRC message.

In one example, the first indication and the second indication may be transmitted in a same PUCCH message or different PUCCH messages. The first indication and the second indication may be transmitted in a same RS or different RSs. The first indication and the second indication may be transmitted in a same PUSCH or different PUSCHs.

In one example, the first RRC message may configure time resource(s) and/or frequency resource(s) on the PSCell for the UE to transmit the first (or second) indication. Thus, the UE may transmit the first (or second) indication on the time resource and/or the frequency resource.

In one example, the first RRC message may not configure time resource(s) and/or frequency resource(s) for the UE to transmit the first (or second) indication. Thus, the UE may transmit the first (or second) indication on time resource(s) and/or frequency resource(s) on the PSCell to the second BS, and the time resource(s) and/or the frequency resource(s) may be configured for the PUCCH (if transmitted in the PUCCH), configured for the RS (if transmitted in the RS) or configured for the PUSCH (if transmitted in the PUSCH). In one example, the time resource (s) and/or the frequency resource (s) may be configured in a second RRC message transmitted to the UE by the second BS before the first RRC message. In one example, the time resource(s) and/or frequency resource(s) may be configured by a DCI transmitted in the PDCCH on the PSCell.

Description/examples for the process 30 may be applied to the process 40, and are not repeated herein. The following is applied to the processes 30 and 40.

In one example, the second BS transmits an activation command to the UE on the PSCell in response to the first RRC message (i.e., configuring the SCell). The activation command is to order the UE to activate the SCell (i.e., order the UE to activate a communication on the SCell). The first BS may transmit the PDCCH order after transmitting the activation command. For example, the second BS transmits the activation command, when/after transmitting the first RRC message or receiving the first RRC response message. The activation command may be a MAC CE in a MAC PDU or may be a DCI. There may be no need to use the PDCCH order. In one example of the process 30, the UE may (start to) transmit the first (or second) RA preamble, when/after activating the SCell. In one example of the process 40, the UE may (start to) transmit the indication, when/after activating the SCell.

In one example, the second BS does not transmit the activation command as described above. There may be no need to use the PDCCH order. In one example of the process 30, the UE may transmit the first (or second) RA preamble, when/after/in response to synchronizing to the SCell in a DL without the PDCCH order (i.e., in response to the first RRC message instead of the PDCCH order). In one example of the process 40, the UE may transmit the indication, when/after/in response to synchronizing to the SCell in the DL.

Figure 5:
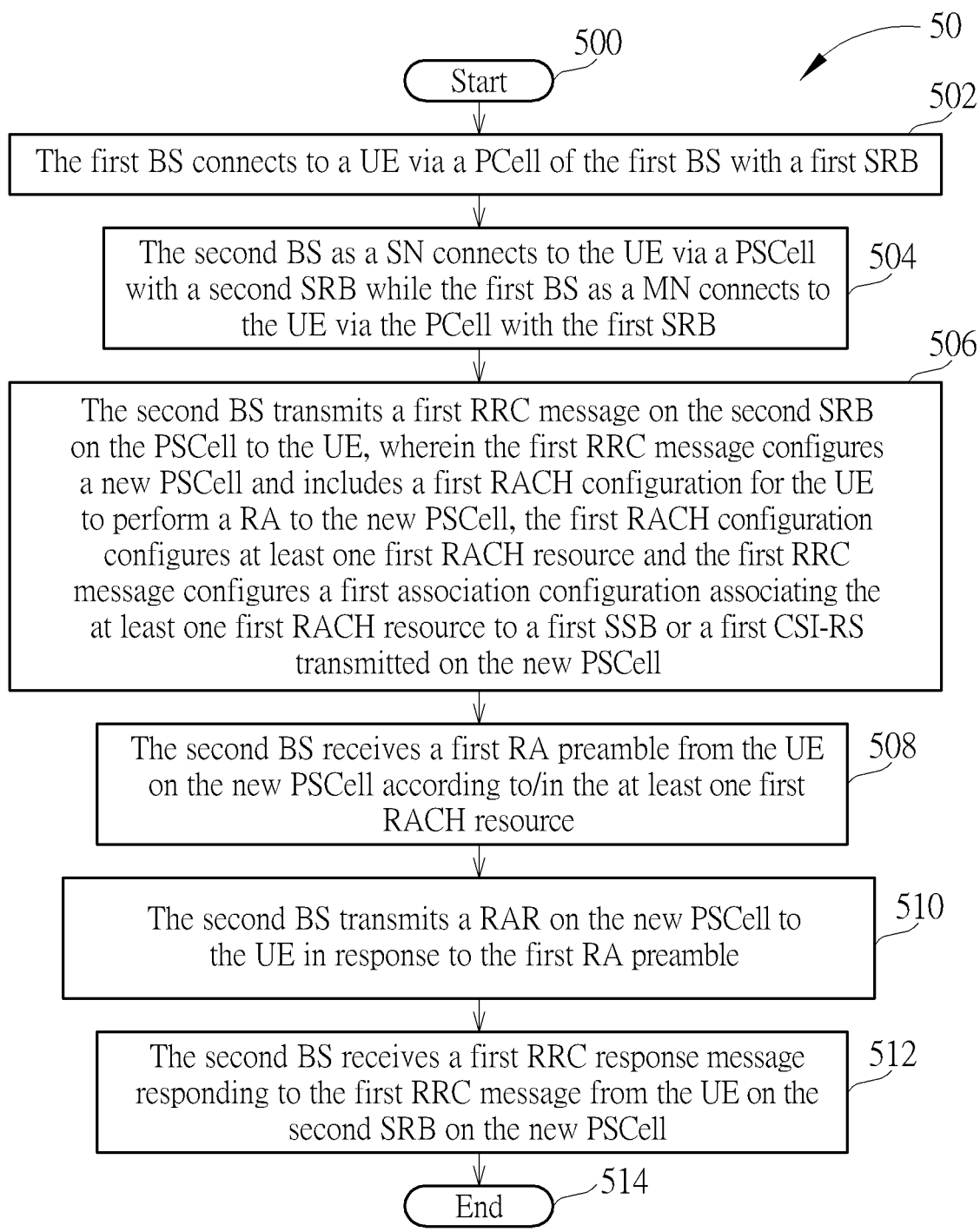
FIG. 5 is a flowchart of a process according to an example of the present invention.

A process 50 in FIG. 5 may be utilized in a network including a first BS and a second BS, and includes the following steps:

Step 500: Start.

Step 502: The first BS connects to a UE via a PCell of the first BS with a first SRB.

Step 504: The second BS as a SN connects to the UE via a PSCell with a second SRB while the first BS as a MN connects to the UE via the PCell with the first SRB.

Step 506: The second BS transmits a first RRC message on the second SRB on the PSCell to the UE, wherein the first RRC message configures a new PSCell (i.e., PSCell change) and includes a first RACH configuration for the UE to perform a RA to the new PSCell, the first RACH configuration configures at least one first RACH resource and the first RRC message configures a first association configuration associating the at least one first RACH resource to a first SSB or a first CSI-RS transmitted on the new PSCell.

Step 508: The second BS receives (or detects) a first RA preamble from the UE on the new PSCell according to/in the at least one first RACH resource.

Step 510: The second BS transmits a RAR on the new PSCell to the UE in response to the first RA preamble.

Step 512: The second BS receives a first RRC response message responding to the first RRC message from the UE on the second SRB on the new PSCell.

Step 514: End.

According to the process 50, the UE connects to the second BS on the new PSCell according to the first RRC message, while connecting to the first BS on the PCell. The second BS communicates with the UE via the new PSCell according to the first RRC message. Thus, the UE simultaneously communicates with the second BS on the new PSCell and with the first BS on the PCell. The first RRC message may include configuration(s) of the new PSCell. The UE and the second BS communicates with each other on the new PSCell according to the configuration(s).

In one example, the RAR includes a preamble identifier associated to the first RA preamble. In one example, the UE transmits the first RRC response message to the second BS using a UL grant in the RAR. In one example, the UE transmits the first RRC response message to the second BS using a UL grant in a DCI in a PDCCH. The second BS may transmit the DCI, after transmitting the RAR or together with the RAR.

Description and examples for the process 30 may be applied to the process 50, and are not repeated herein. The description for the SCell may be applied to the new PSCell.

Figure 6:
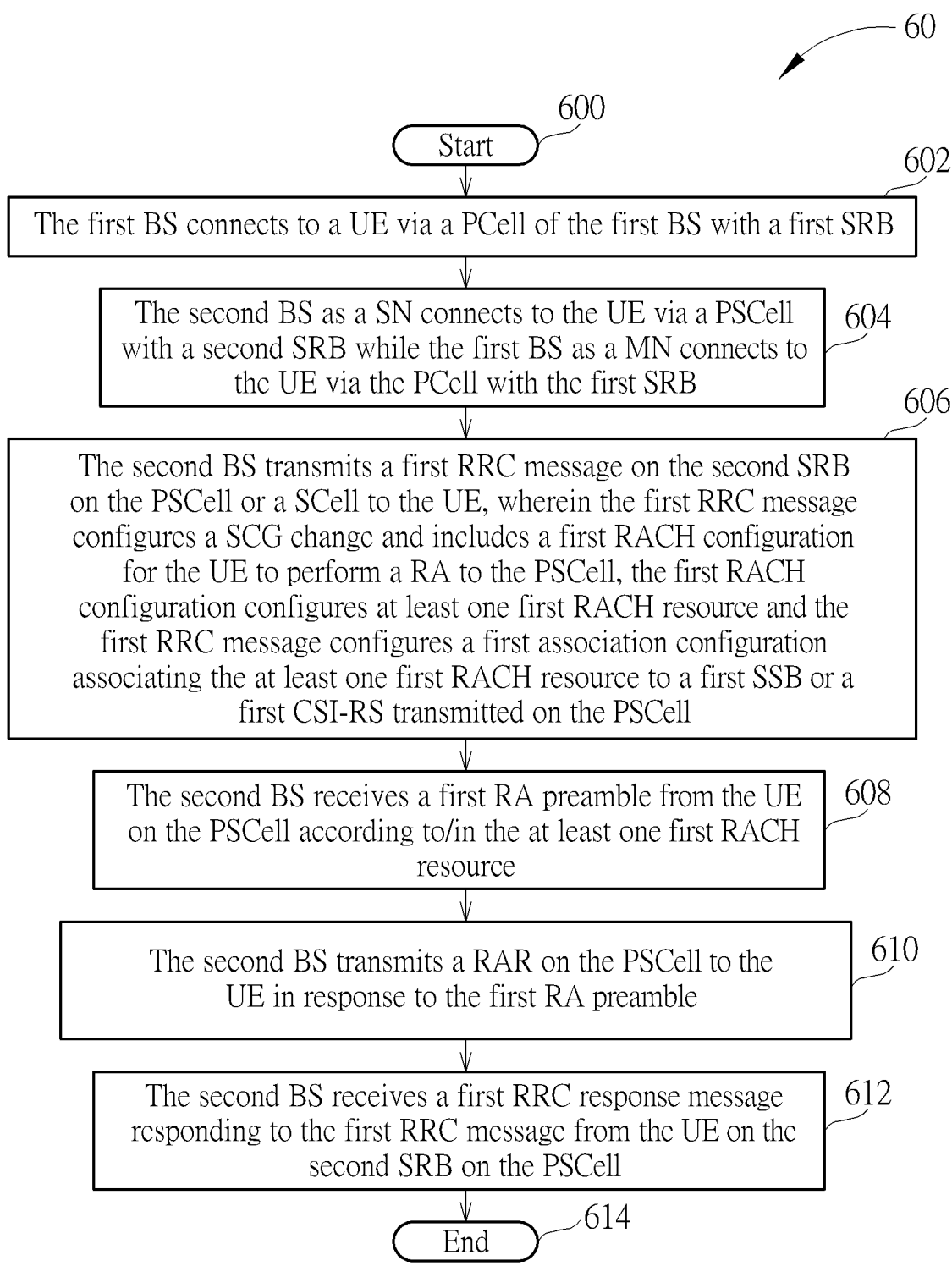
FIG. 6 is a flowchart of a process according to an example of the present invention.

A process 60 in FIG. 6 may be utilized in a network including a first BS and a second BS, and includes the following steps:

Step 600: Start.

Step 602: The first BS connects to a UE via a PCell of the first BS with a first SRB.

Step 604: The second BS as a SN connects to the UE via a PSCell with a second SRB while the first BS as a MN connects to the UE via the PCell with the first SRB.

Step 606: The second BS transmits a first RRC message on the second SRB on the PSCell or a SCell to the UE, wherein the first RRC message configures a SCG change (i.e., changing a configuration configured by the second BS) and includes a first RACH configuration for the UE to perform a RA to the PSCell, the first RACH configuration configures at least one first RACH resource and the first RRC message configures a first association configuration associating the at least one first RACH resource to a first SSB or a first CSI-RS transmitted on the PSCell.

Step 608: The second BS receives (or detects) a first RA preamble from the UE on the PSCell according to/in the at least one first RACH resource.

Step 610: The second BS transmits a RAR on the PSCell to the UE in response to the first RA preamble.

Step 612: The second BS receives a first RRC response message responding to the first RRC message from the UE on the second SRB on the PSCell.

Step 614: End.

According to the process 60, the second BS communicates with the UE on the PSCell and/or the SCell (if configured) according to (e.g., using) a changed configuration in the SCG change. The UE communicates with the second BS on the PSCell and/or the SCell (if configured) according to the changed configuration, while communicating with the first BS on the PCell.

In one example, the RAR includes a preamble identifier associated to the first RA preamble. In one example, the second BS operates at least one Tx beam associated to the SSB or the CSI-RS to transmit a control signal and/or data on the PSCell to the UE, according to the RA preamble.

The following examples may be applied to the processes above.

The RAR includes a preamble identifier associated to the second RA preamble, if the second BS detects the second RA preamble.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. Examples for the UE may be easily generated according to description above. The processes and examples above may be compiled into the program codes 214 in the first BS, the second BS and/or the UE. An example of the means may be the communication device 20.

To sum up, the present invention provides a method and related communication device for efficiently handling a carrier aggregation and dual connectivity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS) and a second BS, comprising:
at least one storage device; and
at least one processing circuit, coupled to the at least one storage device, wherein the at least one storage device stores, and the at least one processing circuit is configured to execute instructions of:
the first BS connecting to a communication device via a primary cell (PCell) of the first BS with a first signalling radio bearer (SRB);
the second BS as a secondary node (SN) connecting to the communication device via a primary secondary cell (PSCell) with a second SRB while the first BS as a master node (MN) connects to the communication device via the PCell with the first SRB;
the second BS transmitting a radio resource control (RRC) message on the second SRB on the PSCell to the communication device, wherein the RRC message configures a new PSCell and comprises a random access channel (RACH) configuration for the communication device to perform a random access (RA) to the new PSCell, the RACH configuration configures at least one RACH resource and the RRC message configures an association configuration associating the at least one RACH resource to a synchronization signal block (SSB) or a channel state information reference signal (CSI-RS) transmitted on the new PSCell;
the second BS receiving a RA preamble from the communication device on the new PSCell according to the at least one RACH resource;
the second BS transmitting a RA response (RAR) on the new PSCell to the communication device in response to the RA preamble; and the second BS receiving a RRC response message responding to the RRC message from the communication device on the second SRB on the new PSCell.

2. The network of claim 1, wherein the RA preamble is a dedicated preamble configured in the RRC message, or is associated to a preamble identifier comprised in the PDCCH order.

3. The network of claim 1, wherein the RA preamble is selected by the communication device from a plurality of RA preambles configured in the RRC message.

4. The network of claim 1, wherein the association configuration comprises a SSB index of the SSB or comprises a CSI-RS configuration of the CSI-RS.

5. The network of claim 1, wherein the instructions further comprise:
the second BS transmitting a physical downlink (DL) control channel (PDCCH) order on the new PSCell to the communication device together with the SSB or the CSI-RS, when transmitting the RRC message or receiving the RRC response message.

6. A method for a network comprising a first base station (BS) and a second BS, comprising steps of:
the first BS connecting to a communication device via a primary cell (PCell) of the first BS with a first signalling radio bearer (SRB);
the second BS as a secondary node (SN) connecting to the communication device via a primary secondary cell (PSCell) with a second SRB while the first BS as a master node (MN) connects to the communication device via the PCell with the first SRB;
the second BS transmitting a radio resource control (RRC) message on the second SRB on the PSCell to the communication device, wherein the RRC message configures a new PSCell and comprises a random access channel (RACH) configuration for the communication device to perform a random access (RA) to the new PSCell, the RACH configuration configures at least one RACH resource and the RRC message configures an association configuration associating the at least one RACH resource to a synchronization signal block (SSB) or a channel state information reference signal (CSI-RS) transmitted on the new PSCell;
the second BS receiving a RA preamble from the communication device on the new PSCell according to the at least one RACH resource;
the second BS transmitting a RA response (RAR) on the new PSCell to the communication device in response to the RA preamble; and
the second BS receiving a RRC response message responding to the RRC message from the communication device on the second SRB on the new PSCell.

7. The method of claim 6, wherein the RA preamble is a dedicated preamble configured in the RRC message, or is associated to a preamble identifier comprised in the PDCCH order.

8. The method of claim 6, wherein the RA preamble is selected by the communication device from a plurality of RA preambles configured in the RRC message.

9. The method of claim 6, wherein the association configuration comprises a SSB index of the SSB or comprises a CSI-RS configuration of the CSI-RS.

10. The method of claim 6, wherein the steps further comprise:
the second BS transmitting a physical downlink (DL) control channel (PDCCH) order on the new PSCell to the communication device together with the SSB or the CSI-RS, when transmitting the RRC message or receiving the RRC response message.

* * * * *